UNITED STATES PATENT OFFICE.

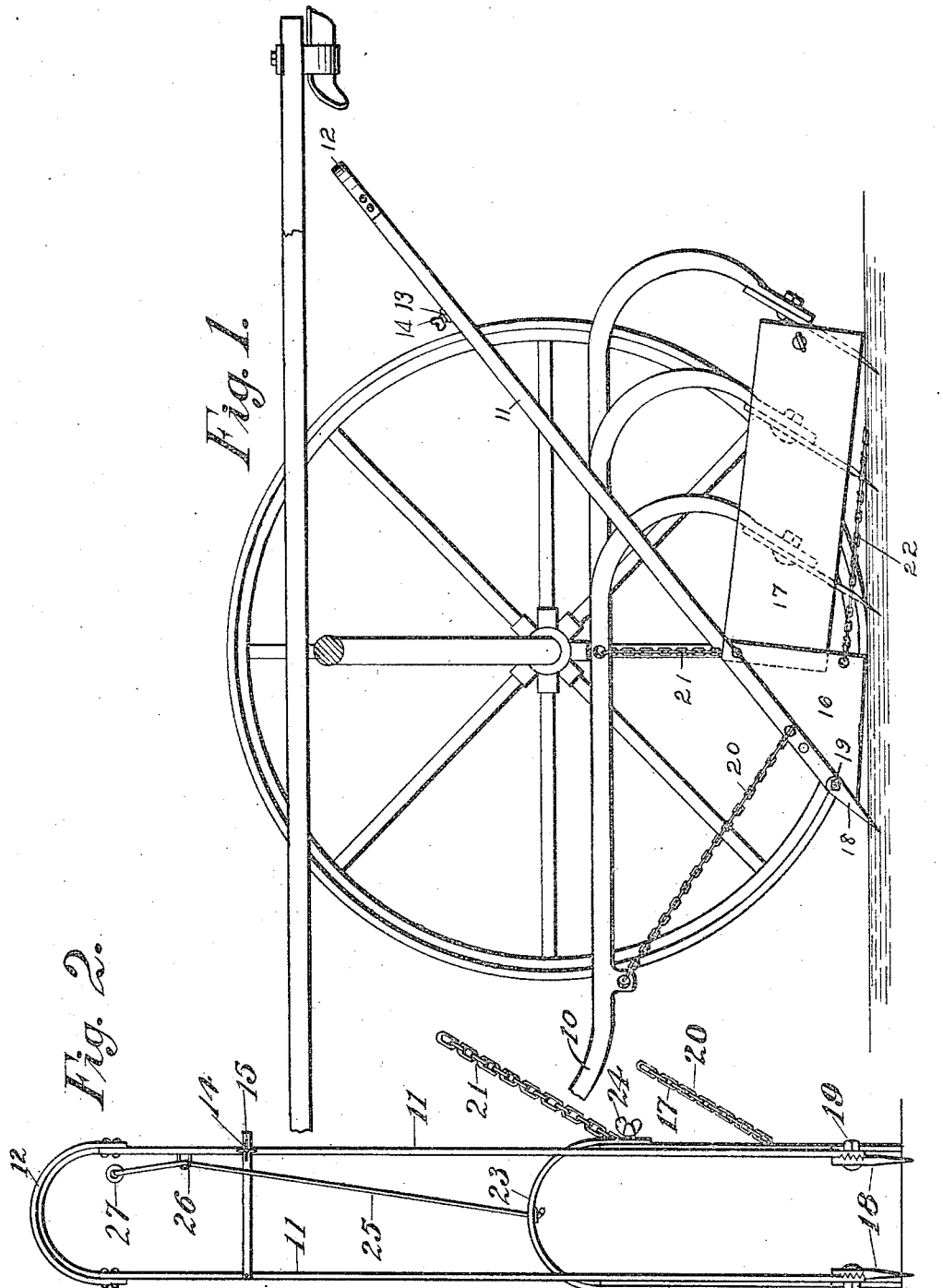

OLIVER E. ADAMSON, OF SHELDAHL, IOWA.

ATTACHMENT FOR CULTIVATORS.

960,764.  Specification of Letters Patent. Patented June 7, 1910.

Application filed January 27, 1908. Serial No. 412,814.

*To all whom it may concern:*

Be it known that I, OLIVER E. ADAMSON, a citizen of the United States, residing at Sheldahl, in the county of Polk and State of Iowa, have invented a new and useful Attachment for Cultivators, of which the following is a specification.

My invention is in the nature of an attachment designed to be applied to ordinary cultivators.

My object is to provide a device that may be quickly and easily attached to or detached from any of the ordinary forms of cultivators now in use.

More specifically it is my object to provide a fender or plant protector so arranged that its sides may run close to the sides of the plants being cultivated, and its top will extend over the plants so that the cultivator shovels may be run deep in the ground, and may throw the ground toward and over the fender, thus thoroughly cultivating the ground adjacent to the row, without in any way injuring the plants in the row. And further in this connection, it is my object to provide devices in the nature of chains designed to run under the edges of the fenders, and to prevent large clods of earth passing under the fenders and dragging down the plants, and also to clean the ground of weeds adjacent to the plants, and under the fender.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a cultivator having my improved fender applied thereto. Fig. 2 shows a front elevation of the attachment disconnected from a cultivator.

Referring to the accompanying drawings, I have used the reference numeral 10 to indicate a cultivator of ordinary construction. The cultivator itself forms no part of my present invention, and therefore it is not illustrated or described herein, except in so far as it is necessary to show the manner of attaching my device thereto.

The frame of the attachment comprises two straight bars 11 connected at their upper ends by means of a semi-circular spring bar 12. A short distance below the upper ends of the bars 11 is a cross piece 13 connected with one of the bars 11, and adjustably connected with the other by means of the bolt 14 operating in the slot 15. In this way, the lower ends of these bars may be adjusted toward and from each other. Connected with the lower end of each of these bars is a forward fender member 16, and pivotally connected at the upper, forward corner with each of the forward fender members 16 is a fender body portion 17, its lower edge being elevated a considerable distance above the lower edge of the fender member 16, so that if the fender member 16 runs on the ground, there will be a considerable space under the forward end fender body portion. The bars 11 are fixed to the forward fender members 16 and extend rearwardly and upwardly therefrom at an angle of about 45 degrees. At the forward end of each of the bars 11 is a cutting blade or point 18. I have provided for adjusting the angles of these blades 18 as follows: Each blade is provided with a ratchet toothed portion at its upper end, to engage a co-acting portion on the bottom of the blade 18, and a bolt 19 passes through the bar 11 and the blade 18, whereby the blade may be adjusted to any desired angle relative to the bar, and there held by means of the co-acting ratchet faces.

I have provided for supporting the device on a cultivator frame by means of two chains 20 attached to the forward ends of the bars 11, and extended forwardly and upwardly and outwardly, and attached to the cultivator frame, and also two chains 21 attached to the bars 11 and extended straight upwardly and outwardly and attached to the frame. Attached to the rear ends of the fender members 16 are the drag chains 22, which extend under the fender portion 17 as clearly shown in Fig. 1.

For use in cultivating small plants, I have provided a fender cover comprising an arched body portion 23, with its sides overlapping the fender body portions 17, and detachably connected therewith by means of the thumb screws 24. In some instances, it is desirable to manually elevate the rear ends of the fender body portions, and for this purpose I have provided a rope 25, which is attached to the arched cover 23 near its rear end, and which passes through a guide loop 26 near the top of the bars 11, and on its upper end is a ring or handle 27. In this way, the operator on the cultivator may readily elevate the rear end of the fender body, and thus permit the cultivator shovels to throw the earth inwardly against the row of plants being cultivated. The said arched cover is made of springing or yielding metal, so that the bars 11 may be adjusted toward and from each other.

In practical use with this portion of the device, and assuming that the plants in the row being cultivated are quite small, I adjust the fender sides so that they will run close to the sides of the plants being cultivated. I then support the bars 13 so that the fenders will run at the desired distance from the ground. This is done by adjusting the length of the chains 20 and 21, and I also adjust the blades 18 so that they will cut through the surface of the ground. When the fenders are supported a considerable distance above the ground, I then turn the blades 18 downwardly so that they will touch the ground and when the fenders are adjusted to run close to the ground, I incline the blades 18 forwardly so that they enter the ground about the same distance. By means of the handle 12, the operator may guide the fender independently of the machine frame.

When the machine is advanced through the field, the cultivator shovels will throw the ground against the fender, and in some instances, over the top of the fender. The arched cover 23 prevents the ground from engaging the plants over the sides of the fender. The ground forced against the sides of the fender by the cultivator shovels will enter under the fender body portions, and will force the drag chains 22 inwardly adjacent to the row of plants. This will cause these drag chains to bear down weeds etc., that grow adjacent to the plants being cultivated, and throw earth over them, and they will also tend to pulverize the ground that passes under the fender body portions and smooth the ground adjacent to the plants. Obviously, when the fenders are elevated to a considerable height, more ground will be thrown under the fenders toward the plants, than when the fenders are run close to the ground, and I therefore adjust the position of the fender with relation to the ground to suit the requirements of the plants being cultivated.

By means of the rope 25, the rear end of the fender may be raised and lowered to adapt the device for the varying conditions of the plants being cultivated, and the operator at all times has access to the upper ends of the bars 11 so that he may adjust the position of the entire device relative to the ground surface to suit the varying conditions of the plants being cultivated.

Having thus described my invention, what I claim and desire to secure by Letters Patent of the United States, therefor, is,—

1. In a device of the class described, the combination of two supporting bars, chains connected therewith for holding said bars on a cultivator or the like, in a position inclined upwardly and rearwardly at an angle of about 45 degrees, earth cutting blades adjustably fixed to the lower ends of said bars, and a fender fixed to each bar.

2. In a device of the class described, the combination with a cultivator of two bars, flexible supporting devices connecting said bars with the cultivator frame so that said bars may be manually guided independently of the cultivator frame, and fender members connected to said bars and designed to travel on opposite sides of a row being cultivated.

3. In a device of the class described, the combination of a cultivator frame, a number of flexible supporting devices fixed to the cultivator frame and extended downwardly and toward each other, two bars carried by said flexible supports, and a fender carried by said bars to thereby provide for normally holding the said bars in position relative to the cultivator frame and to also provide means by which the operator may easily swing the bars to either side.

4. In a device of the class described, the combination of a cultivator frame, a number of flexible supporting devices fixed to the cultivator frame and extended downwardly and toward each other, two bars carried by said flexible supports, and a fender carried by said bars to thereby provide for normally holding the said bars in position relative to the cultivator frame and to also provide means by which the operator may easily swing the bars to either side, and earth cutting blades adjustably fixed to the forward ends of said bars to be capable of entering the earth at different degrees of inclination.

5. The combination of a cultivator frame, a frame comprising guide bars connected with each other, four chains fixed to said guide bars and extending upwardly and on divergent lines and attached to the cultivator frame for normally supporting the said bars in position beneath the cultivator frame, two fender members fixed to the forward ends of said bars, and a fender member pivotally connected with said bars in the rear of the first mentioned fender members and having its rear end capable of free up and down movement, substantially as and for the purposes stated.

6. In a device of the class described, the combination of a cultivator frame, two bars flexibly supported on the cultivator frame, fender devices attached to the lower forward ends of said bars, and means for adjusting said bars toward and from each other and for supporting them in their adjusted positions.

7. In a device of the class described, the combination of a cultivator frame, supporting bars flexibly attached to the supporting frame, two fender members fixed to the supporting bars, two fender members pivotally connected to the supporting bars at their forward upper ends, the lower edges of the latter fender members being spaced above the lower edges of the first mentioned fender members at their forward ends, and flexible drag devices connected to the first mentioned fender members to extend rearwardly under the last mentioned fender members, for the purposes stated.

Des Moines, Iowa, Oct. 2, 07.

OLIVER E. ADAMSON.

Witnesses:
 CHRISTIAN A. BECKER,
 WILLIAM J. LIECHTY.